United States Patent [19]

Petitjean

[11] 4,338,604
[45] Jul. 6, 1982

[54] PULSED COHERENT DOPPLER RADAR WITH FREQUENCY AGILITY

[75] Inventor: Christian H. Petitjean, Colombes, France

[73] Assignee: Le Materiel Telephonique Thomson-CSF, Paris, France

[21] Appl. No.: 173,422

[22] Filed: Jul. 29, 1980

[30] Foreign Application Priority Data

Jul. 31, 1979 [FR] France ................... 79 19633

[51] Int. Cl.³ .............................................. G01S 13/24
[52] U.S. Cl. ..................... 343/17.2 R; 343/17.1 PF; 343/17.2 PC
[58] Field of Search ................... 343/17.1 PF, 17.2 R, 343/17.2 PC

[56] References Cited

U.S. PATENT DOCUMENTS

| | | |
|---|---|---|
| 3,981,012 | 9/1976 | Brault et al. ............... 343/17.2 R X |
| 4,071,844 | 1/1978 | Hopwood et al. ............. 343/17.2 R |
| 4,099,137 | 7/1978 | Alm, Jr. et al. . | |
| 4,155,088 | 5/1979 | Taylor, Jr. et al. ....... 343/17.2 R X |

Primary Examiner—T. H. Tubbesing
Attorney, Agent, or Firm—Oblon, Fisher, Spivak, McClelland & Maier

[57] ABSTRACT

A pulse coherent Doppler radar allows both transmission frequency agility and pulse repetition frequency agility in association with phase encoding which accomplishes the transmission frequency agility by the use of a transmission oscillator, the nominal frequency which may be modified by a microcomputer, a local oscillator, a reference oscillator, and a phase-locked loop having a phase comparator with the oscillator and a mixer for receiving the signals issued by the oscillator and the signal issued by the local oscillator.

4 Claims, 4 Drawing Figures

PULSED COHERENT DOPPLER RADAR WITH FREQUENCY AGILITY

BACKGROUND OF THE INVENTION

1. Field of the Invention

The present invention relates to a pulsed coherent Doppler radar allowing both transmission frequency agility and pulse repetition frequency agility, especially in association with phase encoding.

2. Description of the Prior Art

The practice of frequency agility consists in varying the transmission frequency or pulse repetition frequency of the radar in time, making the radar more difficult to detect in order to improve its resistance to enemy action in, for example, the battle-field.

In conventional radars with frequency agility, high-power oscillator tubes are used in the coherent channels, i.e. the oscillator tube output frequency is memorized by a coherent oscillator known as a "COHO", in order to provide the means of comparison with the signal returned from a target and containing the radio velocity information in the form of its Doppler frequency.

Such radars, however, have many disadvantages. Firstly, the farther the target, the longer the memorization period and the worse the quality of the memorized signal, consequently limiting the extent of ranging although the transmitted power would allow it to be increased.

In addition, the frequency setting time is excessive, since the cavity tuning is mechanical, which often limits the possibility of a frequency jump for each antenna revolution. Moreover, after changing the cavity frequency, the transmission produces a certain degree of instability from one pulse to the next.

In more recent radars, use is made of amplifier systems operating as a coherent channel, i.e. using two ultra-stable oscillators for both transmission and reception.

The validity of this system resides in the low differential phase drift of the oscillators between the instant of transmission and the instant of reception, but in the case of extremely distant targets, this drift is no longer negligible and degrades system quality.

In addition, in order to use frequency agility, it is necessary to multiply the number of oscillators by the number of frequencies to be used, which limits the number of possible frequencies because of increasing cost of the equipment.

SUMMARY OF THE INVENTION

The present invention proposes a pulsed Doppler radar with frequency agility requiring no memorization and providing permanent phase control of the two oscillators to a fixed frequency difference, which eliminates degradation of the visibility factor for long ranges.

In addition, the oscillators possess a structure enabling them to produce several frequencies, the time for changing from one frequency to another being considerably shortened compared with that of mechanical solutions, thereby allowing the use of several frequencies per second.

Finally, the present invention proposes another improvement allowing the transmitted pulse repetition frequency to be varied about its center value, whilst remaining synchronous, in order to eliminate blind speeds and reduce the radial velocity for which ambiguity relating to the periodicity of the transmitted signal occurs.

According to one characteristic of the invention, the pulsed coherent Doppler radar with frequency agility consists of an antenna used for both transmission and reception and a coherent transmission-reception channel comprising:

for transmission, a pulse modulator whose synchronization input is connected to a synchronization circuit and whose output is connected to the input of a power amplifier whose output is connected to the antenna via a duplexer;

for reception, a power amplifier whose input is connected to the antenna via the duplexer and whose output is connected to one of the inputs of a first mixer whose output is connected to one of the inputs of a second mixer whose output is connected to a data analysis device;

a voltage-controlled transmission oscillator whose nominal frequency is determined by first modification means and whose output is connected to the input of the modulator;

a local oscillator consisting of a frequency synthetizer whose output local frequency is determined by second modification means and whose output is connected to the second input of the first mixer of the receive channel;

a reference oscillator piloting the frequency synthetizer and whose output is connected to the second input of the second mixer of the receive channel and to the input of the modulator synchronization circuit;

and a phase-lock loop comprising a phase comparator whose first input is connected to the output of the reference oscillator, whose second input is connected to the output of a third mixer whose first input is connected to the output of the local oscillator and the second to the output of the transmission oscillator, and whose output is connected to the voltage control input of the transmission oscillator, enabling the transmission oscillator to be phase-locked to the local oscillator with a frequency difference equal to the intermediate frequency produced by the reference oscillator.

According to another characteristic of the invention, the radar comprises repetition frequency modification means consisting of a frequency divider whose input is connected to the output of the reference oscillator, whose output is connected to the pulse modulator synchronization circuit and whose divide ratio is determined by the microprocessor.

According to another characteristic of the invention, the radar simultaneously comprises compatible phase encoding, transmission frequency agility and pulse repetition frequency agility means.

BRIEF DESCRIPTION OF THE DRAWINGS

The purposes and characteristics of the present invention appear more clearly from the following description of illustrative embodiments, the said description referring to the appended drawings in which.

DETAILED DESCRIPTION OF THE PREFERRED EMBODIMENTS

Figure 1:
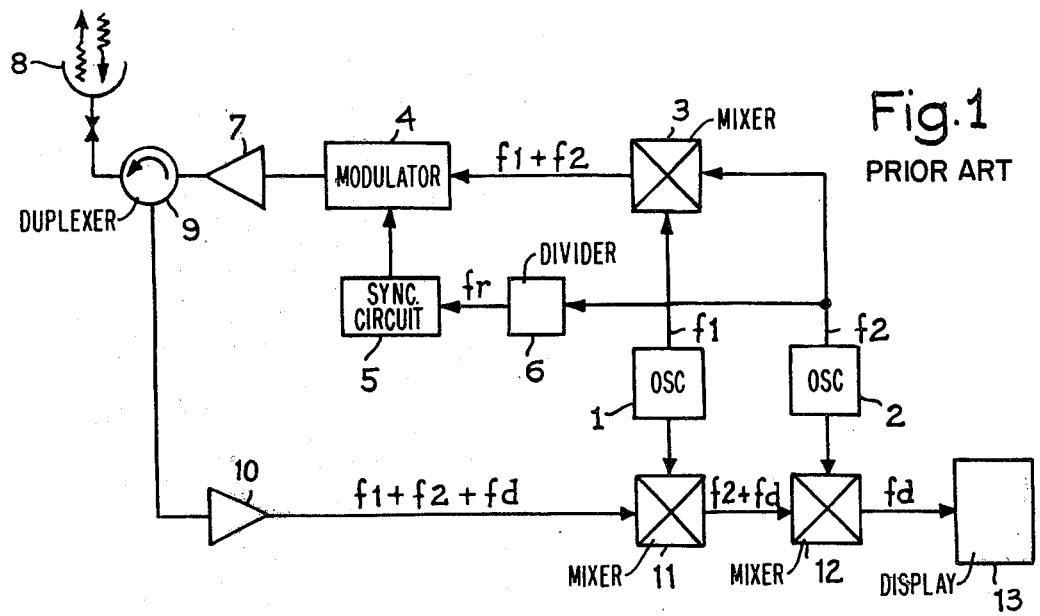
FIG. 1 is a conventional example of a pulsed Doppler radar with a coherent transmit-receive system.

An example of a conventional pulsed Doppler radar 10 with a coherent transmit-receive system is shown in FIG. 1.

This system comprises two ultra-stable oscillators 1 and 2 of frequencies f1 and f2. The output signals of these oscillators are changed in a mixer 3 which selects the upper beat frequency f1+f2. The signal produced in this manner is pulsed by a modulator 4 in synchronism with a clock signal whose frequency or repetition frequency fr is an exact submultiple of f2. This synchronization is performed by a synchronization circuit 5, which is fed with the reference signal fr produced by a frequency divider 6 connected to the output of oscillator 2. The signal produced by modulator 4 is then amplified by a power amplifier 7, and is then transmitted by an antenna 8 common to both transmission and reception via a duplexer 9.

The transmitted signal is reflected by any targets and becomes the return signal whose delay with respect to the transmitted signal is proportional to the range of the target and whose frequency shift fd, or Doppler frequency, with respect to the transmitted frequency is proportional to the radial velocity of the target.

Upon reception, the return signal is first amplified by means of a power amplifier 10, and this signal is then mixed a first mixer 11 with the output signal of oscillator 1 to produce after filtering out of the lower beat frequency a signal of frequency f2+fd.

The signal produced in this manner is mixed with the output signal of oscillator 2 by means of a second mixer 12, and the lower beat frequency is filtered to produce a signal of frequency fd. This signal of frequency fd is then processed by the radar data analysis and display means 13.

In order to obtain range and velocity data without system errors, it is necessary to use ultra-stable oscillators, which results in the disadvantages already mentioned above.

Figure 2:
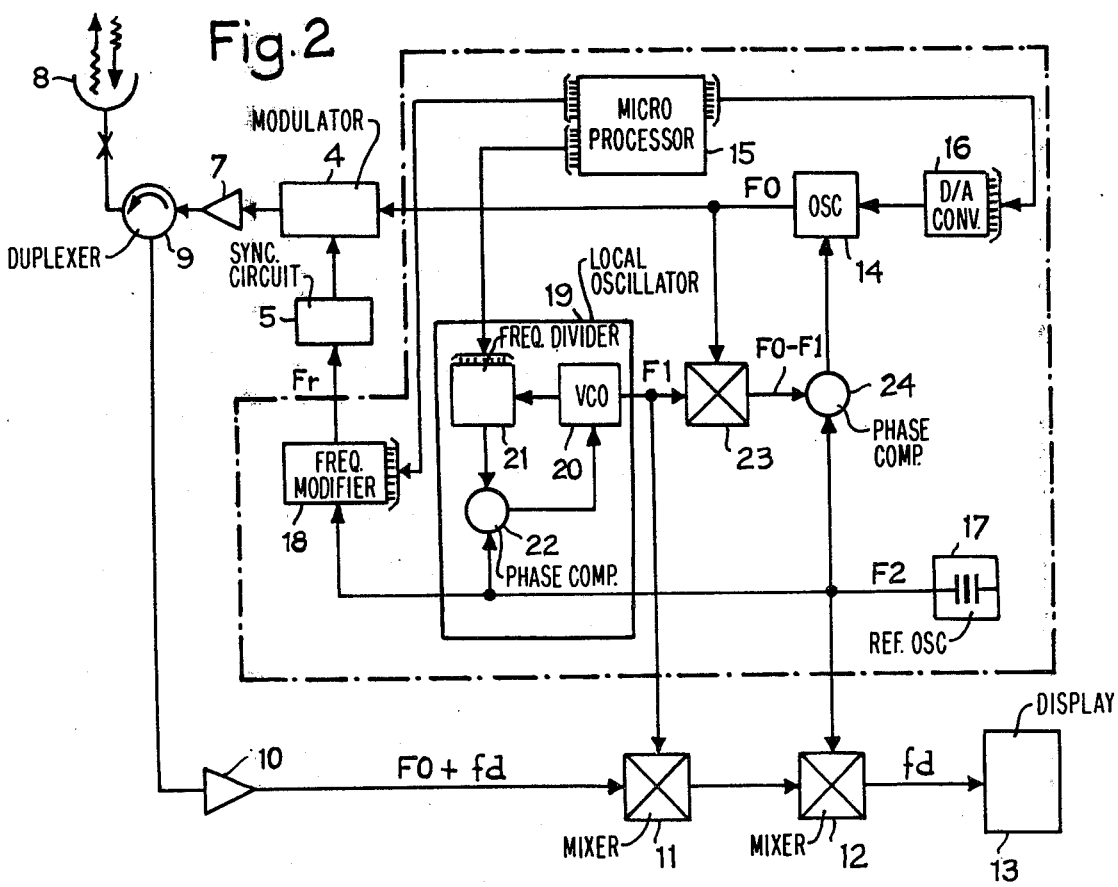
FIG. 2 represents an example of a radar in accordance with the present invention.

FIG. 2 represents a practical example of a radar in accordance with the present invention allowing transmission frequency agility and pulse repetition frequency agility to be used easily and with high dependability.

Items in FIGS. 1 and 2 having the same number are identical and the parts specific to the present invention are surrounded with a dashed line.

The radar comprises a voltage-controlled transmission oscillator 14 whose frequency F0 is firstly determined by frequency modification means. These means shown in FIG. 2 consist of control by a microprocessor 15 via a digital-to-analogue converter 16 operating, for example, on a variable-capacity diode. The signal of frequency F0 produced by oscillator 14 is then pulsed by the modulator 4.

The radar comprises a reference oscillator 17 of frequency F2. This oscillator must have excellent phase and frequency stability and, for example, a crystal oscillator is used.

The signal produced by the transmission oscillator 14 is pulsed in synchronism with a clock signal whose frequency or repetition frequency Fr is an exact submultiple of F2, this synchronism being obtained by means of the synchronization circuit 5 which is fed with this clock signal via the pulse repetition frequency modification means 18 described below.

Following modulation, the signal of frequency F0 is transmitted and reflected as explained for the case of FIG. 1, and the radar receives a return signal of frequency F0+fd, which is amplified by amplifier 10.

The radar comprises a local oscillator 19 which produces a signal of frequency F1. This oscillator 19 is structured as a programmable frequency synthetizer. It possesses a voltage-controlled oscillator 20 producing the signal of frequency F1. This oscillator 20 is piloted by the reference oscillator 17 by means of a phase-lock loop comprising oscillator 20, a frequency-divider 21 with a variable ratio N programmed by the microprocessor 15, which is fed with the output signal of oscillator 20 and produces a signal of frequency F1/N, and a phase comparator 22 which is fed with the output signal of the frequency-divider 21 and also the output signal of the reference oscillator 17, and which produces the control voltage of oscillator 20. This synthetizer produces a signal of frequency F1 equal to N.F2 which is coherent in phase with the output signal of the reference oscillator 17.

Finally, the radar comprises a phase-lock loop which includes firstly the transmission oscillator 14, secondly a mixer 23 whose first input is connected to the output of the local oscillator 19, whose second input is connected to the output of the transmission oscillator 14, which mixes the signals of frequencies F1 and F0 produced by oscillators 19 and 14 respectively, and which produces by filtering the lower beat signal of frequency F0−F1, and thirdly a phase comparator 24 whose first input is fed with the signal of frequency F0−F1 obtained from mixer 23, whose second input is fed with the signal of frequency F2 obtained from the reference oscillator 17 and whose output is connected to the voltage control input of the transmission oscillator 14.

This phase-lock loop phase-locks the transmission oscillator 14 to the local oscillator 19 with a fixed frequency difference and in this case chosen equal to the frequency F2 of the output signal produced by the reference oscillator 17, i.e. frequency F0 is equal to the sum of frequencies F1 and F2 under steady-state conditions.

It is for this reason that mixer 11 mixes the return signal of frequency F0+fd with the signal of frequency F1 produced by the local oscillator 19 in order to produce by filtering the lower beat signal of frequency F0+fd−F1, and since F0 is equal to F1+F2, a signal of frequency F2+fd is obtained on the output of mixer 11.

It then merely remains to mix this signal with the signal of frequency F2 by means of mixer 12 to obtain by filtering a signal whose frequency is equal to the Doppler frequency fd.

The device described above with reference to FIG. 2 allows the use of transmission frequency agility, i.e. it enables the transmission frequency to be varied several times per second by means of the microprocessor 15, which controls the transmission oscillator 14 and which consequently controls the local oscillator 19.

Controlling oscillator 19 consists in selecting the ratio N of the variable-ratio frequency-divider 21 such that with F0 selected and F2 fixed, F0−(N−F2)=F1 is produced.

Because of the phase-lock loop, it is thus possible under steady-state conditions to obtain permanent phase control of the transmission oscillator 14 and the local oscillator 19 with a frequency difference equal to the fixed reference frequency F2. The problem of oscillator stability is thus solved and this device can therefore be used without the danger of degraded visibility factor for long radar ranges, i.e. ranges in excess of thirty kilometers.

Although frequencies F0 and F1 are modified in this illustrative embodiment by means of a microprocessor, such modification can also be performed by means of an operator with encoding thumb-switches. Microprocessor control, however, has many advantages: firstly it enables several frequencies per second to be used, and secondly, by associating memories with the microprocessor, it can change the frequencies sequentially by means of previously determined sequences recorded in these memories.

At the same time as transmission frequency agility, this radar can also provide pulse repetition frequency agility by the use of means 18 for modifying the frequency Fr.

Since detection is in phase-coherence with the reference frequency F2 in order to obtain zero output frequency fd when the Doppler frequency is zero, the repetition frequency Fr must be a submultiple of frequency F2 such that the phase of the return signal is constant at the origin.

In the radar shown in FIG. 1, the repetition frequency fr is obtained by dividing the carrier frequency f2 by means of the frequency-divider 6, and the condition "fr submultiple of f2" is satisfied.

The simplest practical means for providing pulse repetition frequency agility consists in using as modification means 18 a variable-ratio frequency-divider, whose input is connected to the output of the reference oscillator 17, whose output is connected to the synchronization circuit 5 and whose ratio is determined either manually by means of encoding thumb-switches or sequentially or when required with the assistance of the microprocessor 15.

This possibility of pulse repetition frequency variation offers advantages for detection (blind speeds) as explained above, but also from the point of view of protection, since it makes decoding by the enemy more difficult.

Figure 3:
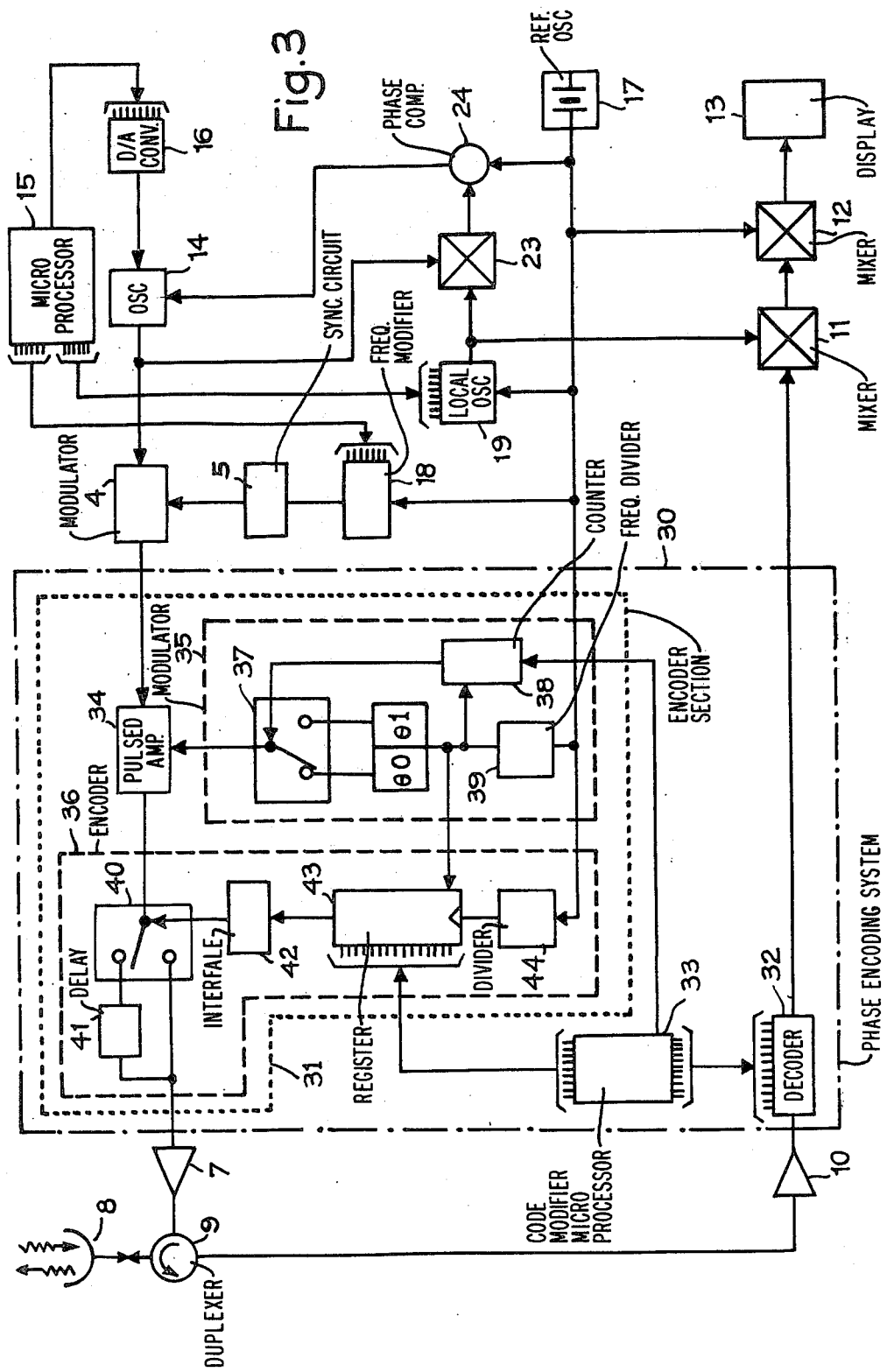
FIG. 3 represents another example of a radar in accordance with the present invention, in which are associated frequency agilities and phase encoding.

This protection is further increased by the association of two types of frequency agility described above, with phase encoding. A radar associating these characteristics is shown in FIG. 3, items having the same reference numbers in FIGS. 2 and 3 being identical.

The system 30, corresponding to phase encoding, comprises encoding means 31 in the transmit channel between the modulator 4 and power amplifier 7, decoding means 32 in the receive channel consisting for example of an n-bit programmable acoustic line between amplifier 10 and mixer 11, and code modification means 33 consisting essentially of a microprocessor, which are connected to the encoding means 31 for modifying the code and to the decoding means 32 for adapting them automatically to the new code.

The encoding means 31 consist of a pulsed amplifier 34, a modulator 35 and an encoder 36.

The pulsed amplifier 34 is fed from the modulator 4 with pulses of width $\mu$ at the pulse repetition frequency Fr, and feeds the encoder 36 with stretched pulses of width $\theta$, the value of $\theta$ being determined by modulator 35 and the ratio $\theta/\mu$ being equal to n.

This modulator 35 consists of an electronic switch 37, which is connected to the pulsed amplifier 34 and which enables the value of $\theta$ to be selected from several predetermined values ($\theta 0$ and $\theta 1$ in FIG. 4), depending on the operating mode: search or tracking, with or without phase encoding. The switch 37 is controlled by a counter 38, which is clocked by the output signal of a frequency-divider 39 connected to the reference oscillator 17. This counter is connected to the microprocessor 33, which generates different operating sequences.

The encoder 36 comprises a switch 40 which is connected one side to the output of the pulsed amplifier 34 and the other side to the transmission amplifier 7 both directly and via a delay line 41. The control input of switch 40 is connected via an interface 42 to the output of a parallel-to-serial shift register 43, whose inputs are connected to the code modification means 33.

Phase encoding is achieved by changing the position of switch 40, which occurs every $\mu$ microseconds, i.e. n times in $\theta$ microseconds, since depending on the position of switch 40, the pulse is fed directly to amplifier 7 or via the delay line 41 for a 180° phase-shift before transmission.

The operation of the phase encoding means is not described in greater detail, since they are not the subject of the present invention.

The clocking input of register 43 is connected to the output of a frequency-divider 44 whose input is connected to the output of the reference oscillator 17, such that each encoded pulse obtained from the encoding means 31 is in phase at the origin with the reference signal of frequency F2, and consequently with the signal produced by the transmission oscillator 14, which is in phase with the local oscillator, itself in phase with the reference oscillator, in accordance with the first characteristic of the invention.

For this system to operate, the width $\mu$ of the transmitted pulse must be a multiple of the period of the reference oscillator 17, i.e. $\mu = k.(1/F2)$, k being in this case the divide ratio of divider 44.

In addition, for pulse repetition frequency agility and phase encoding to be compatible, a pulse repetition frequency change must preserve synchronism, with the result that the variation or frequency jump must correspond to a change of period of $\mu$ microseconds.

Figure 4:
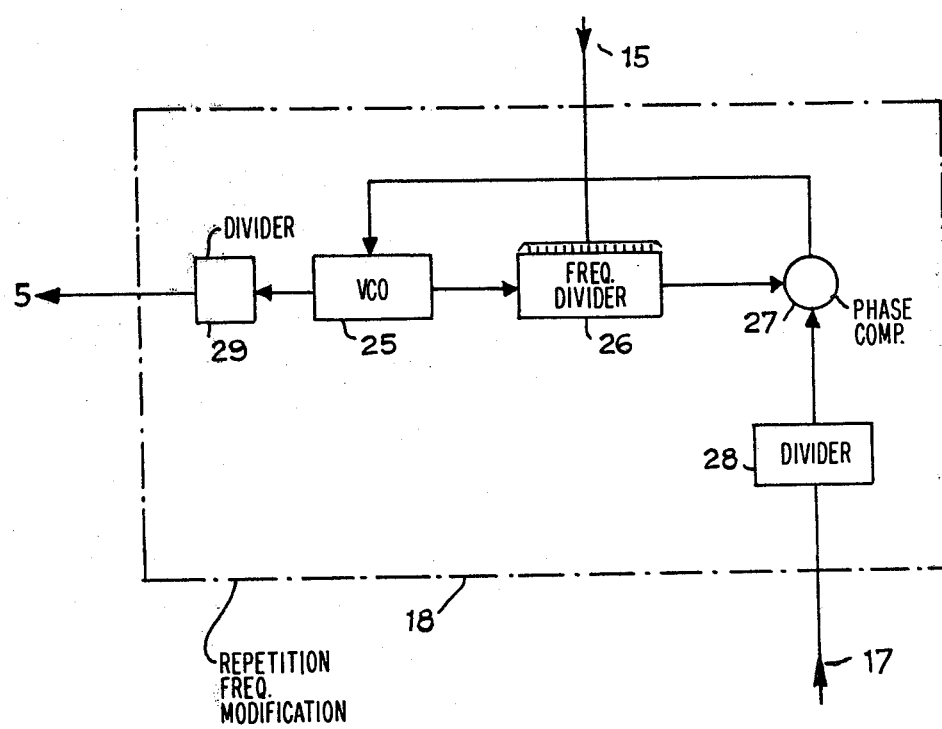
FIG. 4 represents in detail the pulse repetition frequency modification means in accordance with the present invention.

FIG. 4 shows the repetition frequency modification means 18 which preserve synchronism.

These means consist essentially of a phase-lock loop comprising firstly a voltage-controlled oscillator 25 of nominal frequency F, secondly a frequency-divider 26 having a variable ratio V controlled by the microprocessor 15, which determines the value of V between M−m and M+m, this divider being fed with the signal of frequency F produced by oscillator 25 and producing a signal of frequency F/V, and thirdly a phase comparator 27 whose first input is connected to the output of the variable-ratio frequency-divider 26, whose second input is connected to the output of a divider 28 of ratio R, which is connected to the output of the reference oscillator 17, and whose output is connected to the control voltage input of oscillator 25.

The output of oscillator 25 is connected to the synchronization circuit 5 via a divider 29 of ratio M which produces a signal having the repetition frequency Fr.

These means 18 enable frequency Fr to be varied plus or minus i in F2/R.M increments about the value F2/R, where $1 \leq i \leq m$, the increment F2/R.M corresponding to a period variation of $\mu$ microseconds close to frequency F2/R.

For example, for a reference frequency F2 of 60 MHz and a pulse repetition frequency of 3 kHz, i.e. R equal to 20,000, and a pulse width of 0.333 $\mu$s, the repetition period corresponding to a repetition frequency of 3 kHz is equal to 1/3 kHz, i.e. 333.33 $\mu$s, which corresponds to 1000 pulses of width $\mu$. The frequency variation increment F2/R.M is therefore 3 Hz close to 3000 Hz, whence M=1000 and F=3 MHz. The repetition frequency Fr can vary in as far as:

$$Fr = 3000 \pm i \times 3 \text{ Hz, where } 0 \leq i \leq m.$$

By these means, Fr can be modified without modifying system synchronism as long as m has a value less than that for which the maximum tolerated error for the quality of the radar is reached. In the above numerical example, quality is still excellent for m=20.

I claim:

1. A pulsed coherent Doppler radar with frequency agilities consisting of an antenna for both transmission and reception and a coherent transmit-receive system comprising for transmission a modulator (4) producing pulses of width $\mu$ at the repetition frequency (Fr), whose synchronization input is connected to a synchronization circuit (5) and whose output is connected to the input of a power amplifier (7) whose output is connected to the antenna (8) via a duplexer (9), a voltage-controlled transmission oscillator (14) whose output is connected to the input of the modulator (4) and which is phase-locked to a local oscillator (19) with a frequency difference equal to the intermediate frequency produced by a reference oscillator (17), by means of a phase-lock loop which comprises a phase comparator (24) whose first input is connected to the output of the reference oscillator (17), whose second input is connected to the output of a first mixer (23) whose first input is connected to the output of the local oscillator (19) and whose second input is connected to the output of the transmission oscillator (14), and whose output is connected to the control voltage input of the transmission oscillator (14), and which comprises for reception a power amplifier (10) whose input is connected to the antenna (8) via the duplexer (9) and whose output is connected to one of the inputs of a second mixer (11) whose output is connected to one of the inputs of a third mixer (12) whose other input is connected to the output of the reference oscillator (17) and whose output is connected to a data analysis device (13), wherein the nominal frequency (F0) of the transmission oscillator (14) is determined by first frequency modification means (15 and 16), wherein the local oscillator (19) consists of a frequency synthetizer whose local output frequency (F1) is determined by second modification means (15 and 21) and whose output is connected to the second input of the second mixer (11), and wherein the reference oscillator (17) piloted by the frequency synthetizer (19) also has its output connected to the input of third means (18 and 15) modifying the repetition frequency (Fr), whose output is connected to the synchronization circuit (5) of the pulse modulator.

2. A pulsed coherent Doppler radar with frequency agilities in accordance with claim 1, wherein the first and second frequency modification means consist of a microprocessor (15) connected firstly to the transmission oscillator via a digital-to-analogue converter (16) and secondly to the frequency synthetizer of the local oscillator (19), and wherein the same microprocessor (15) is connected to the control inputs of a variable-ratio frequency-divider (18) forming part of the third frequency modification means.

3. A pulsed coherent Doppler radar with frequency agilities in accordance with claim 2, comprising phase encoding means consisting firstly of encoding means (31) comprising a pulsed amplifier (34) which is controlled by a modulator (35) and whose input is connected to the output of a pulse modulator (4), an encoder which comprises an electronic switch (40) connected on one side to the output of the pulsed amplifier (34) and on the other to the transmission amplifier (7) both directly and via a delay line (41), and a parallel-to-serial shift register (43) whose output is connected to the control input of the electronic switch, secondly of decoding means 32 between the receive amplifier and first mixer, and thirdly of code modification means (33) connected to the encoding means and decoding means, wherein the clocking input of the encoder shift register is connected to the output of a frequency divider (44) of ratio $k = \mu \cdot F2$, whose input is connected to the output of the reference oscillator (17), and wherein the synchronization inputs of the modulator (35) and the shift register (43) are connected to the output of the oscillator (17) via another frequency-divider (39).

4. A pulsed coherent Doppler radar with frequency agilities in accordance with claim 3, wherein it comprises third pulse repetition frequency modification means consisting of an oscillator (25) voltage-controlled by the output signal of a phase comparator (27) of which one input is connected to the output of the reference oscillator (17) via a frequency-divider (28) of ratio R and whose other input is connected to the output of the oscillator (25) of the loop via a divider (26) of variable ratio V, where $M - m \leq V \leq M + m$, controlled by modification means (15), the oscillator output being connected via a frequency-divider (29) of ratio M to the input of the synchronization circuit (5) of the modulator (4), to which it feeds a signal of frequency Fr equal to $Fr/R \pm (i \cdot Fr/R \cdot M)$, where $0 \leq i \leq m$ and with R chosen such that the variation increment F2/R.M corresponds to a period variation of width $\mu$ close to the frequency F2/R.

* * * * *